Patented May 24, 1932

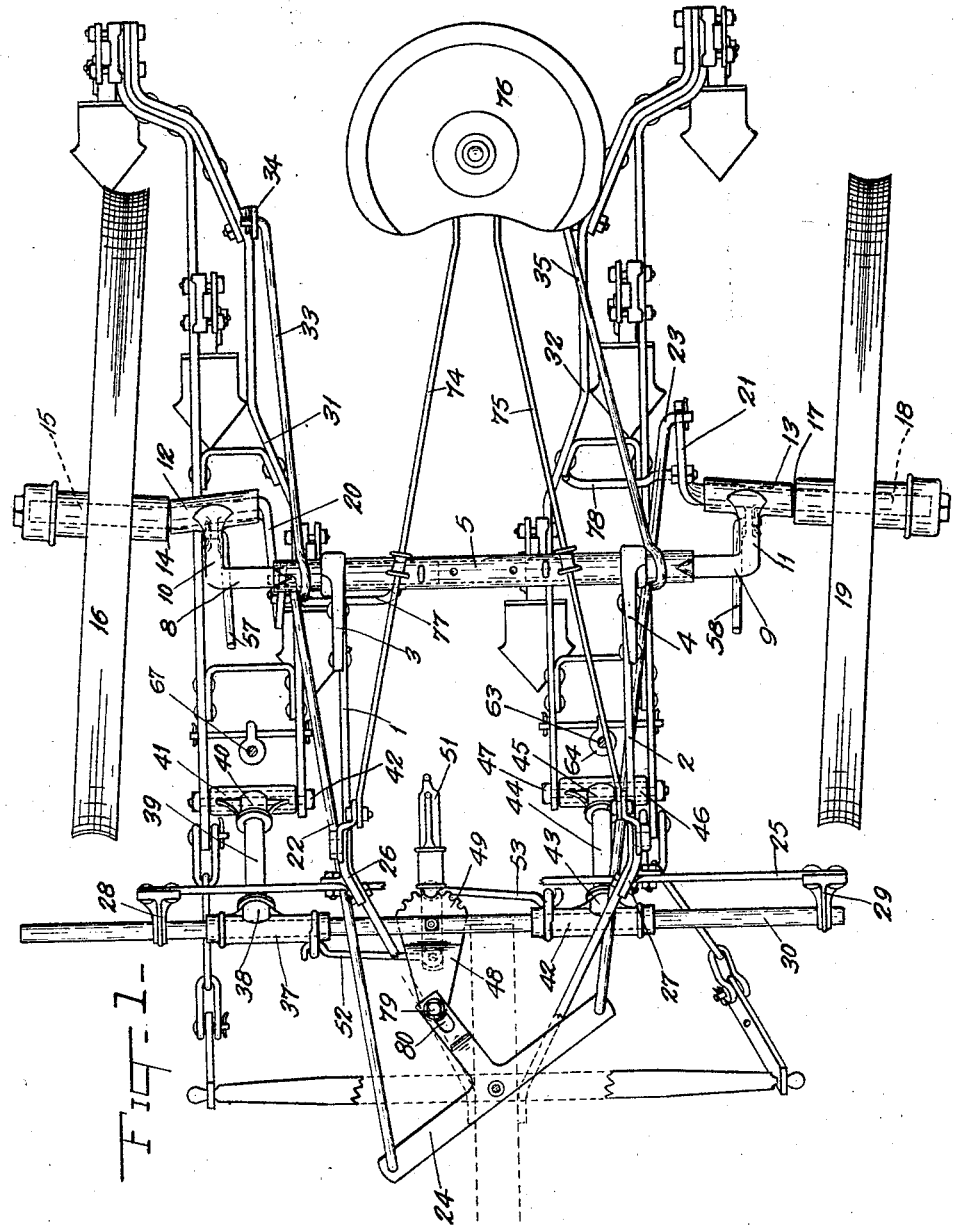

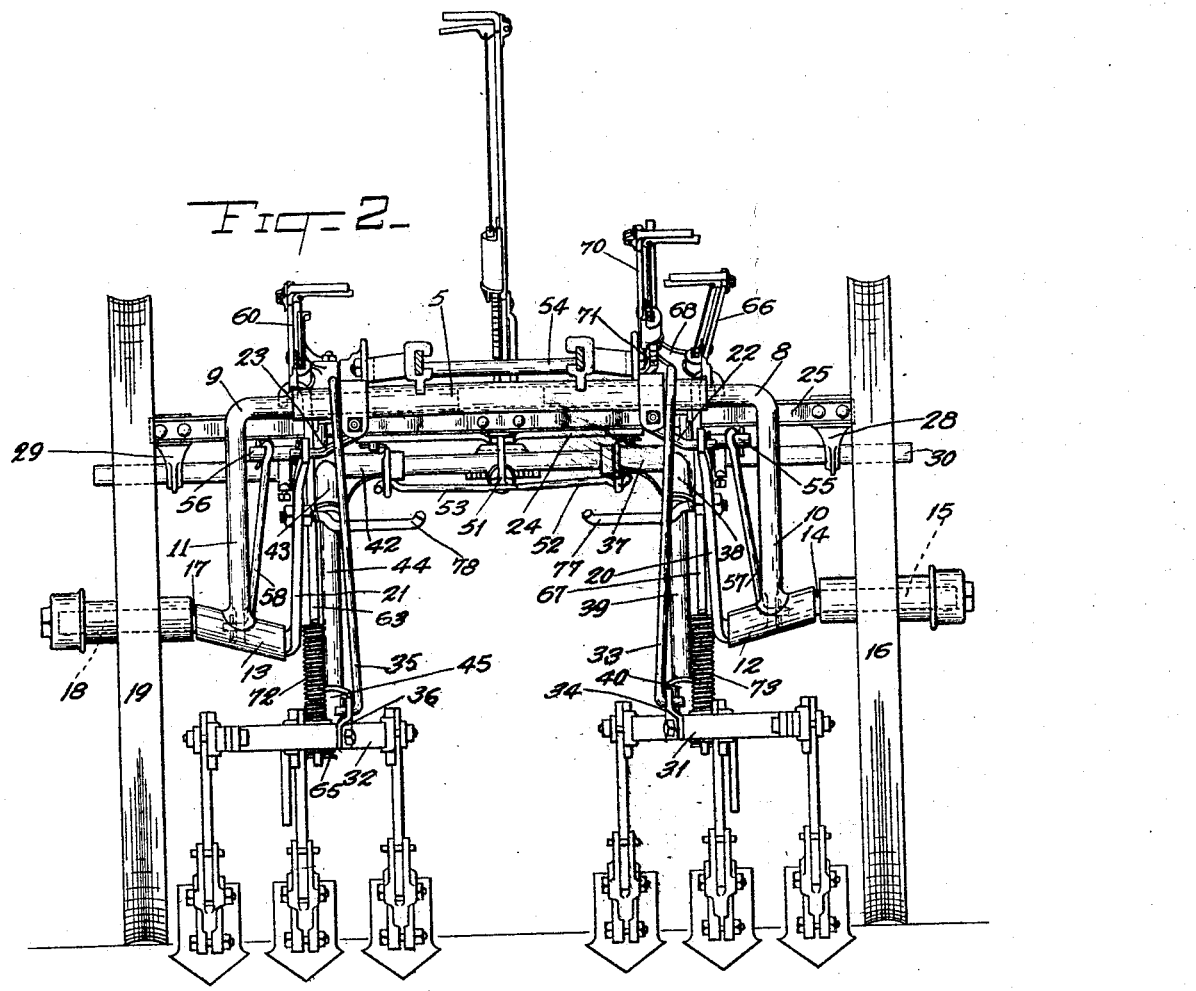

1,859,415

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

CULTIVATOR

Application filed April 3, 1924, Serial No. 703,915. Renewed February 20, 1931.

My invention relates to cultivators and particularly to the control of the wheels and the cultivating rigs, and an object of my invention is to provide a simple, effective and novel means operative to steer the wheels and to correspondingly adjust the cultivating rigs.

Referring to the drawings in which similar numerals indicate identical parts—

Figure 1 illustrates position of the parts when steering from the direct line of advance.

Figure 2 is a rear view of Figure 1.

The frame of the cultivator comprises side bars 1 and 2 which are rigidly secured respectively to brackets 3 and 4 secured on a pipe or tube 5. The side bars 1 and 2 converge forwardly and between the forward ends is pivotally mounted, by a horizontal transverse bolt 6, a tongue or pole 7. Rockably journaled in the tube 5 are crank axles 8 and 9 having vertical portions 10 and 11 to the lower ends of which are secured, in any suitable manner, sleeves or bearings 12 and 13 inclined downwardly toward each other. A spindle 14 is rockably journaled in the sleeve 12 and has a horizontal portion 15 on which is mounted a supporting wheel 16; a similar spindle 17 is rockably journaled in the sleeve 13 and has a horizontal portion 18 on which is mounted a supporting wheel 19. An arm 20, preferably integral with the spindle 14, extends upwardly from the inner end of the spindle and substantially parallel with the vertical portion 10 of the crank axle 8, and a similar arm 21 is preferably integral with the spindle 17. The upper ends of the arms 20 and 21 are bent rearwardly, for a purpose hereafter explained, and to their rearward terminations rods 22 and 23 are respectively connected and extend forwardly to pivotal attachment to opposite ends of a horizontally rocking member 24 pivotally supported, intermediate its length, on the tongue 7.

A transverse bar 25 is rigidly supported on brackets 26 and 27 mounted on the side bars 1 and 2 respectively, and slidably supported in bearings 28 and 29, on the bar 25, is a shaft 30. Rigs of cultivating devices are designated by 31 and 32. The rig 31 is attached to the cultivator by a rod 33 having its lower end hooked in an eye in a casting 34 on the rig 31, and the upper end of the rod is provided with a loop fitting over the pipe 5; the rig 32 is attached in a similar manner by a rod 35 hooked in a casting 36 on the rig 32, and having a loop at its upper end fitting over the pipe 5. Forwardly the rig 31 is pivotally supported on the shaft 30 by a coupling consisting of a sleeve 37 having at a right angle thereto a socket 38 in which is rigidly held a post 39 which extends to and secured in a socket 40 on a sleeve 41 attached to the rig 31 by a bolt 42. A similar coupling supports the rig 32 on the shaft 30 and comprises a sleeve 42 and a socket 43 in which is secured a post 44 having its lower end held in a socket 45 on a sleeve 46 mounted on a bolt 47 on the forward part of the rig 32.

Rigidly bolted centrally on the shaft 30 is a member 48, its rear end a curved rack 49, and its forward end terminating in a point to which is pivotally connected an arm preferably integral with the rocking member 24, and central thereof. Pivoted intermediate its length, on the bolt which holds the member 48 on the shaft 30, is a lever 51 provided with the usual type of latch to engage with the notches in the rack 49; a link 52 is attached to the forward end of the lever 51 and to an eye on the sleeve 37, and a similar link 53 is attached to the lever 51, rearward of its pivot, and to an eye in the sleeve 42. By operation of the lever 51 the rigs, through the links 52 and 53 attached to the lever and to the sleeves 37 and 42, can be readily adjusted toward or from each other to accommodate the desired width of cultivation.

Mounted in bearings, formed preferably integral with the brackets 26 and 27, is a rock shaft 54 provided with crank ends 55 and 56. To the crank end 55 is connected a rod 57 extending rearwardly and attached to an eye on the sleeve 12; a similar rod 58 is connected to the crank end 56 and to an eye on the sleeve 13. A casting is rigid on the crank end 56 of the rock shaft 54, and pivotally mounted thereon is a lever 60 provided with the usual type of latch to engage with a rack on the rock shaft 54 and preferably integral with the casting. To an eye, on the lever 60, and intermediate its ends, is attached a rod 63 which extends downwardly through a sleeve 64 on the rig 32 and is secured therein by a cotter 65. By operation of the lever 60, the rig 32 is raised or lowered independently of the rig 31, which is also raised or lowered by operation of a lever 66 connected to the rig 31 by a rod 67 in a manner similar to the rod 63. The lever 66 is pivotally mounted on a casting 68, rigidly secured on a crank end 55 of the rock shaft 54, and has a latch to engage with a rack on the casting 68. To raise or lower both rigs simultaneously, I employ a master lever 70 rigidly attached to the casting 68 and provided with a latch to engage with an arcuate rack 71 mounted on the frame bar 1, the lever 70 operating to rock the shaft 54, and as the levers 60 and 66, which are operable to raise the rigs independently, are pivotally supported on the crank ends of the rock shaft 54 and held in position by the latches on said levers engaging with the racks, it follows that both rigs will be raised or lowered simultaneously irrespective of the position they may be in by actuation of the levers 60 and 66. Coiled springs 72 and 73, mounted on the rods 63 and 67 respectively, exert an expansive force between cotters or pins on said rods and the sleeves 64 on the rigs to hold the rigs to their work when in operation.

Bars 74 and 75 are secured at their forward ends to the brackets 26 and 27 respectively, and converge rearwardly to support a seat 76 conveniently placed to accommodate leg reach of an operator to foot pieces 77 and 78, mounted respectively on the arms 20 and 21, and by pressure upon which the wheels are steered and the rigs correspondingly shifted.

In Figure 1 the wheels have been steered to the right and the rigs shifted in the same direction, and this action is accomplished by pressure of the foot of the operator on the foot piece 77, rocking the arm 20 forwardly and thereby imparting a limited rotary motion to the spindle 14; during this operation the crank axle 8 is stationary, consequently the horizontal portion 15 of the spindle, which is at an obtuse angle to the inclined portion, is swung to the right and steers the wheel 16 in that direction, the portions 15 and 18 retaining a constant horizontal position. The forward motion of the arm 20 forces the rod 22 forwardly and rocks the member 24, to which the rod 23 is connected and thrusts the rod 23 rearwardly, rocking the arm 21 rearwardly and imparting a limited rotary movement to the spindle 17 whereby the horizontal portion 18 thereof is swung and the wheel 19 is steered simultaneously with the wheel 16 and in parallelism therewith. It is clearly apparent that if the arm 21 is rocked forwardly by force applied to the foot piece 78, the operation of the parts just described will be reversed and the wheels will be steered to the left.

The member 24 is pivotally supported on the tongue 7, and the rearwardly extending arm of the member 24 is pivotally connected to the forward point of the member 48 by a vertical bolt 79; in the member 48, which extends through a slot 80 in said arm. Now as the tongue 7 is not movable bodily to right or left, the swing of the member 24, by the connection of the arm with the member 48, moves the member 48 in the direction in which the wheels are steered, so that the shaft 30, to which the member 48 is rigidly connected, and the rigs carried thereon are moved simultaneously with the steering of the wheels 16 and 19 and in the same direction, irrespective of the position of the rigs 31 and 32 relative to each other, the shaft 30 sliding readily in the bearings 28 and 29.

As before stated, the arms 20 and 21 are bent rearwardly at their upper ends and to the termination of the bent portions are respectively attached the rods 22 and 23, which extend forwardly to connection with the member 24. Now when the master lever 70 is operated, to raise the rigs 31 and 32 simultaneously, the rock shaft 54 is actuated to swing the crank ends thereof rearwardly and through the rods 57 and 58 the axles 8 and 9 are swung in the same direction; during this operation, the member 24 and the rods 22 and 23, connected to the arms 20 and 21, are stationary, but the rods 22 and 23 are attached to the arms 20 and 21 respectively, the points of attachment being in alignment, and also in substantially vertical alignment with the axis of the wheels 16 and 19 when the cultivator is in operation. Now if the arms 20 and 21 were straight, the point of attachment of the rods 22 and 23 thereto would be forward of the axis of the wheels, and would be stationary in the operation of raising the rigs by actuation of the master lever 70, consequently when the crank axles 8 and 9 are swung rearwardly, the movement of the sleeves 12 and 13 upon the angulated portions of the spindles 14 and 17 would cause an outward flare of the wheels 16 and 19, an objectionable action to be avoided if possible.

Standard cultivators are constructed with a gather to the wheels, the gather in this instance being too slight to be shown in the drawings; and to prevent a flare of the wheels 16 and 19 in the operation of the parts just described, I bend the upper portions of the arms 20 and 21 rearwardly, as shown, and to their extremity attach the rods 22 and 23 with the attachment in substantially vertical alignment with the axis of the wheels 16 and 19, when the cultivator is in operation, as before stated, for I find that by this construction the rearward swing of the axles 8 and 9 and the angulated sleeves 12 and 13 thereon, even to the limit of their movement, will swing the wheels 16 and 19 only a sufficient distance to bring them into parallel relation with each other, possibly removing the gather but preventing a flare. When operating between rows of plants, the steering movement of the wheels is limited because of the narrow width of the space between the rows, and during this limited steering movement of the wheels, the parts of the spindles on which the wheels are mounted, and which are substantially horizontal when the cultivator is traveling in a straight line, maintain a substantially horizontal position during the limited steering movement.

What I claim is—

1. In an agricultural implement including a frame, the combination therewith of crank axles supported on the frame, spindles rockably supported on the crank axles, ground wheels on the spindles, a rocking member pivotally mounted on the implement and extending in opposite directions from its pivot transversely of the implement, a vertical arm integral with the inner end of each spindle, a rod connecting each arm with an end of said member, and means operable to rock one of said arms and spindle and to simultaneously actuate said member to rock the other arm and spindle whereby the ground wheels are steered angularly to the line of draft.

2. In an agricultural implement including a frame, the combination therewith of crank axles supported on the frame, a horizontal rocking member pivoted on the implement spindles rockably mounted on the axles, an arm extending vertically from the inner end of each spindle and integral therewith, the upper portion of each arm bent rearwardly, a rod connected to each end of said member and attached to the upper ends of said arms at a point normally in substantially the vertical plane of the axis of said spindles, means operable to rock either of the arms and spindles and simultaneously actuate said member to rock said arms in unison whereby said wheels are steered angularly to the line of draft.

3. In an agricultural implement including a frame, the combination therewith of crank axles supported on the frame and having downwardly extending portions, a sleeve on the lower end of each portion, said sleeves arranged at a vertical angle to said portions and extended toward each other, a spindle journaled in each sleeve and having a horizontal portion on which a ground wheel is mounted, a vertical extending arm integral with the inner end of each spindle, a horizontally disposed rocking member pivoted intermediate its length on the implement and connected with said arms, and means operable to rock one of said arms forwardly and simultaneously actuate said member to rock the other arm in the opposite direction whereby the ground wheels are steered angularly to the line of draft.

4. In an agricultural implement including a frame, the combination therewith of crank axles supported on the frame, spindles rockably mounted on the axles, an arm extending vertically from the inner end of each spindle, and connected therewith, the upper portion of each arm bent rearwardly, a horizontal rocking member pivotally mounted on the implement and extending in opposite directions from its pivot transversely of the implement, a rod connected to each end of said member and attached to the upper and rear ends of said arms, means operable to rock either of the arms and spindles and simultaneously actuate said member to rock said arms in unison whereby said wheels are steered angularly to the line of draft.

5. In an agricultural implement including a frame, the combination therewith of bearings supported on the frame and inclined downwardly toward the longitudinal center thereof, spindles rotatably journaled in said bearings having outwardly extending horizontal portions, supporting wheels mounted on said portions, and mechanism mounted on the frame and connected with said spindles and operable to rotate said spindles in opposite directions to steer the wheels.

6. In an agricultural implement including a frame, the combination therewith of bearings supported on the frame and inclined downwardly toward the longitudinal center thereof, spindles rotatably journaled in said bearings having outwardly extending horizontal portions on which supporting wheels are mounted, and mechanism mounted on the frame and connected with the inner ends of said spindles and operable to rotate said spindles in opposite directions to steer the wheels.

7. In an agricultural implement including a frame, the combination therewith of bearings supported on the frame inclined downwardly toward the longitudinal center thereof and opposite each other, spindles rotatably journaled in said bearings and having outwardly extending horizontal portions, supporting wheels mounted on said horizontal portions, a rocking member pivotally mounted on the implement and connected with each spindle, and means operable to rock said member and rotate said spindles in opposite directions to steer the wheels.

8. In an agricultural implement including a frame, the combination therewith of bearings supported on the frame inclined downwardly toward the longitudinal center thereof, spindles rotatably journaled in said bearings and having outwardly extending horizontal portions, supporting wheels mounted on said portions, a horizontally disposed rocking member pivotally mounted on a vertical pivot on the implement and connected with each spindle, and means operable to rock said member and rotate said spindles in opposite directions to steer the wheels.

9. In an agricultural implement including a frame, the combination therewith of bearings supported on the frame inclined downwardly toward the longitudinal center of the frame, spindles rotatably journaled in said bearings and having outwardly extending horizontal portions, supporting wheels mounted on said portions, a vertical arm on the inner end of each spindle, a rocking member pivotally mounted on the implement and connected with said arms, and means operable to rock one of said arms and spindles in one direction and simultaneously actuate said member to rock the other arm and spindle in the opposite direction to steer the wheels.

10. In an agricultural implement including a frame, the combination therewith of supporting wheels therefor, spindles having horizontal portions on which said wheels are mounted, said spindles bent intermediate their length substantially at an obtuse angle to the horizontal portions and extending laterally of the implement, bearings supported on the frame in which the angulated portions of the spindles are rockably journaled, a vertical arm on each spindle, a rocking member pivotally mounted on a vertical pivot on the implement, an arm projecting from each spindle at an angle therewith and connected with said member, and means operable to rock one of said arms and spindles and simultaneously actuate said member to rock the other arm and spindle to steer the wheels.

11. In an agricultural implement including a frame, the combination therewith of supporting wheels therefor, spindles having horizontal portions on which said wheels are mounted, said spindles bent intermediate their length at substantially an obtuse angle to the horizontal portions and extending laterally of the implement, downwardly inclined bearings supported on the frame in which said angulated portions are journaled, an arm projecting at an angle from the bent portion of each spindle, a rocking member mounted on the implement and connected with said arms, and means operable to rock one of said arms and spindles in one direction and simultaneously actuate said member to rock the other arm and spindle in the reverse direction to steer the wheels simultaneously.

12. In an agricultural implement including a frame, the combination therewith of crank axles supported on the frame and having downwardly extending portions, a sleeve on the lower end of each portion, said sleeves arranged at a vertical angle to said portions and extended downwardly toward each other, a spindle journaled in each sleeve and having a substantially horizontal portion on which a ground wheel is mounted, each spindle having a vertically extending arm, a horizontally rocking member pivotally supported on the implement and connected with said arms, means on said arms operable to rock either of said spindles to steer the wheel thereon and to simultaneously rock said member to actuate the opposite spindle in the reverse direction whereby both wheels are steered in parallelism.

13. In an agricultural implement including a frame, the combination therewith of a spindle comprising two sections disposed at an obtuse angle to each other, the first section being rockably mounted on said frame at an angle to the horizontal so as to position the second section normally substantially horizontal, a ground wheel mounted on said second section, and mechanism mounted on the frame and connected with said spindle and operable to rotate said spindle in opposite directions to steer the wheel.

14. In an agricultural implement including a frame, the combination therewith of a spindle comprising two sections disposed at an obtuse angle to each other, the first section being rockably mounted on said frame at an angle to the horizontal so as to position the second section normally substantially horizontal, a ground wheel mounted on said second section, and mechanism mounted on the frame and connected with the inner end of said spindle and operable to rotate said spindle in opposite directions to steer the wheel.

15. In an agricultural implement including a frame, the combination therewith of a spindle comprising two sections disposed at an obtuse angle to each other, the first section being rockably mounted on said frame at an angle to the horizontal so as to position the second section normally substantially horizontal, a ground wheel mounted on said second section, a rocking member pivotally mounted on the implement to rock said member and rotate said spindle in opposite directions to steer the wheel.

16. In an agricultural implement including a frame, the combination therewith of a spindle comprising two sections disposed at an obtuse angle to each other, the first section being mounted on said frame so as to position the second section normally substantially horizontal and rockable about an axis coincident with its longitudinal center line, a ground wheel mounted on said second section an arm projecting at an angle from the first portion of said spindle, a rocking member mounted on the implement and connected with said arm, a link connecting said rocking member and said arm, and means for rocking said rocking member to rock said spindle to steer the wheel.

CARL G. STRANDLUND.